United States Patent
Wu et al.

(10) Patent No.: US 11,966,271 B2
(45) Date of Patent: *Apr. 23, 2024

(54) ETHERNET PHY-MAC COMMUNICATION WITH IN-BAND WAKE-UP/SLEEP COMMANDS

(71) Applicant: Marvell Asia Pte Ltd, Singapore (SG)

(72) Inventors: Dance Wu, Palo Alto, CA (US); Christopher Mash, Harpenden (GB); Daryl J. Hoot, Saratoga, CA (US); Hong Yu Chou, Saratoga, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 169 days.

This patent is subject to a terminal disclaimer.

(21) Appl. No.: 17/497,997

(22) Filed: Oct. 11, 2021

(65) Prior Publication Data

US 2022/0026978 A1 Jan. 27, 2022

Related U.S. Application Data

(63) Continuation of application No. 16/841,715, filed on Apr. 7, 2020, now Pat. No. 11,169,591.

(60) Provisional application No. 62/832,768, filed on Apr. 11, 2019.

(51) Int. Cl.
*G06F 1/00* (2006.01)
*G06F 1/3287* (2019.01)
*H04L 12/10* (2006.01)

(52) U.S. Cl.
CPC ............ *G06F 1/3287* (2013.01); *H04L 12/10* (2013.01)

(58) Field of Classification Search
CPC . G06F 1/3287; H04L 12/10; H04L 12/40039; H04L 12/12; Y02D 30/50
See application file for complete search history.

(56) References Cited

U.S. PATENT DOCUMENTS

| | | | |
|---|---|---|---|
| 8,856,570 B2 | 10/2014 | Diab et al. | |
| 10,585,469 B2* | 3/2020 | Yu | G06F 1/3209 |
| 2009/0257457 A1* | 10/2009 | Diab | H04J 3/0685 |
| | | | 370/503 |
| 2010/0111081 A1* | 5/2010 | Diab | G06F 1/3234 |
| | | | 370/389 |
| 2010/0262844 A1* | 10/2010 | Diab | G06F 1/3209 |
| | | | 713/300 |

OTHER PUBLICATIONS

CN Application # 2020800276496 Office Action dated Nov. 28, 2023.

* cited by examiner

*Primary Examiner* — Xuxing Chen

(57) ABSTRACT

An Ethernet communication device includes a data interface and circuitry. The data interface is configured for communicating with a neighbor device. The circuitry is configured to exchange Ethernet data frames with the neighbor device over the data interface, wherein successive data frames are separated in time by an Inter-Packet Gap (IPG) having at least a predefined minimal duration, and to further exchange with the neighbor device, over the data interface, during the IPG between Ethernet frames exchanged on the data interface, a wake-up/sleep command that instructs switching between an active mode and a sleep mode.

14 Claims, 2 Drawing Sheets

ETHERNET PHY-MAC COMMUNICATION WITH IN-BAND WAKE-UP/SLEEP COMMANDS

CROSS-REFERENCE TO RELATED APPLICATIONS

This application is a continuation of U.S. patent application Ser. No. 16/841,715, filed Apr. 7, 2020, which claims the benefit of U.S. Provisional Patent Application 62/832,768, filed Apr. 11, 2019. The disclosures of these related applications are incorporated herein by reference.

FIELD OF THE DISCLOSURE

The present disclosure relates generally to network communication, and particularly to methods and systems for wake-up/sleep operation in Ethernet™ networks.

BACKGROUND

Various applications, such as automotive in-car communication systems, certain industrial communication systems and smart-home systems, require communication at high data rates over relatively small distances. Several types of protocols and communication media have been proposed for such applications. For example, Ethernet communication over twisted-pair copper wire media is specified in "IEEE 802.3bw-2015—IEEE Standard for Ethernet Amendment 1: Physical Layer Specifications and Management Parameters for 100 Mb/s Operation over a Single Balanced Twisted Pair Cable (100BASE-T1)," March, 2015.

Some Ethernet networks, such as networks installed in automotive environments, are required to support sleep and wake-up mechanisms. Such mechanisms are not defined in the above-cited IEEE 802.3bw standard. To bridge this gap, the TC10 technical committee of the One-Pair Ether-Net (OPEN) Alliance Special Interest Group (SIG) has specified service primitives provided by the ISO/OSI layer 1 (PHY) and supporting a controlled link shutdown and a fast global wake-up within an Ethernet network, in "OPEN Sleep/Wake-up Specification," version 2.0, February, 2017. This specification is commonly referred to as the "OPEN TC10 specification."

The description above is presented as a general overview of related art in this field and should not be construed as an admission that any of the information it contains constitutes prior art against the present patent application.

SUMMARY

An embodiment that is described herein provides an Ethernet communication device including a data interface and circuitry. The data interface is configured for communicating with a neighbor device. The circuitry is configured to exchange Ethernet data frames with the neighbor device over the data interface, wherein successive data frames are separated in time by an Inter-Packet Gap (IPG) having at least a predefined minimal duration, and to further exchange with the neighbor device, over the data interface, during the IPG between Ethernet frames exchanged on the data interface, a wake-up/sleep command that instructs switching between an active mode and a sleep mode.

In an embodiment, the Ethernet communication device further includes a management interface that is separate from the data interface, and the circuitry is configured to exchange management commands with the neighbor device over the management interface, and to exchange the wake-up/sleep commands over the data interface and not over the management interface.

In some embodiments, the Ethernet communication device includes an Ethernet physical layer (PHY) device, and the neighbor device includes an Ethernet Medium Access Control (MAC) device. In other embodiments, the Ethernet communication device includes an Ethernet MAC device, and the neighbor device includes an Ethernet PHY device.

In some embodiments, the circuitry is configured to generate the wake-up/sleep command and to insert the generated wake-up/sleep command in the IPG, for transmission to the neighbor device over the data interface. In an embodiment, the circuitry is configured to transmit an idle pattern during the IPG, when not transmitting the wake-up/sleep command.

In some embodiments, the circuitry is configured to receive the wake-up/sleep command from the neighbor device during the IPG, to decode the received wake-up/sleep command, and to cause a Medium Access Control (MAC) device to wake-up from sleep mode or to enter sleep mode in response to the wake-up/sleep command. In an embodiment, the circuitry is configured to distinguish between the wake-up/sleep command and an idle pattern, which is transmitted by the neighbor device during the IPG when not transmitting the wake-up/sleep command.

There is additionally provided, in accordance with an embodiment that is described herein, a method for Ethernet communication including exchanging Ethernet data frames with a neighbor device over a data interface. Successive data frames are separated in time by an Inter-Packet Gap (IPG) having at least a predefined minimal duration. A wake-up/sleep command, which instructs switching between an active mode and a sleep mode, is further exchanged with the neighbor device over the data interface, during the IPG between Ethernet frames exchanged on the data interface.

The present disclosure will be more fully understood from the following detailed description of the embodiments thereof, taken together with the drawings in which:

DETAILED DESCRIPTION OF EMBODIMENTS

Figure 1:
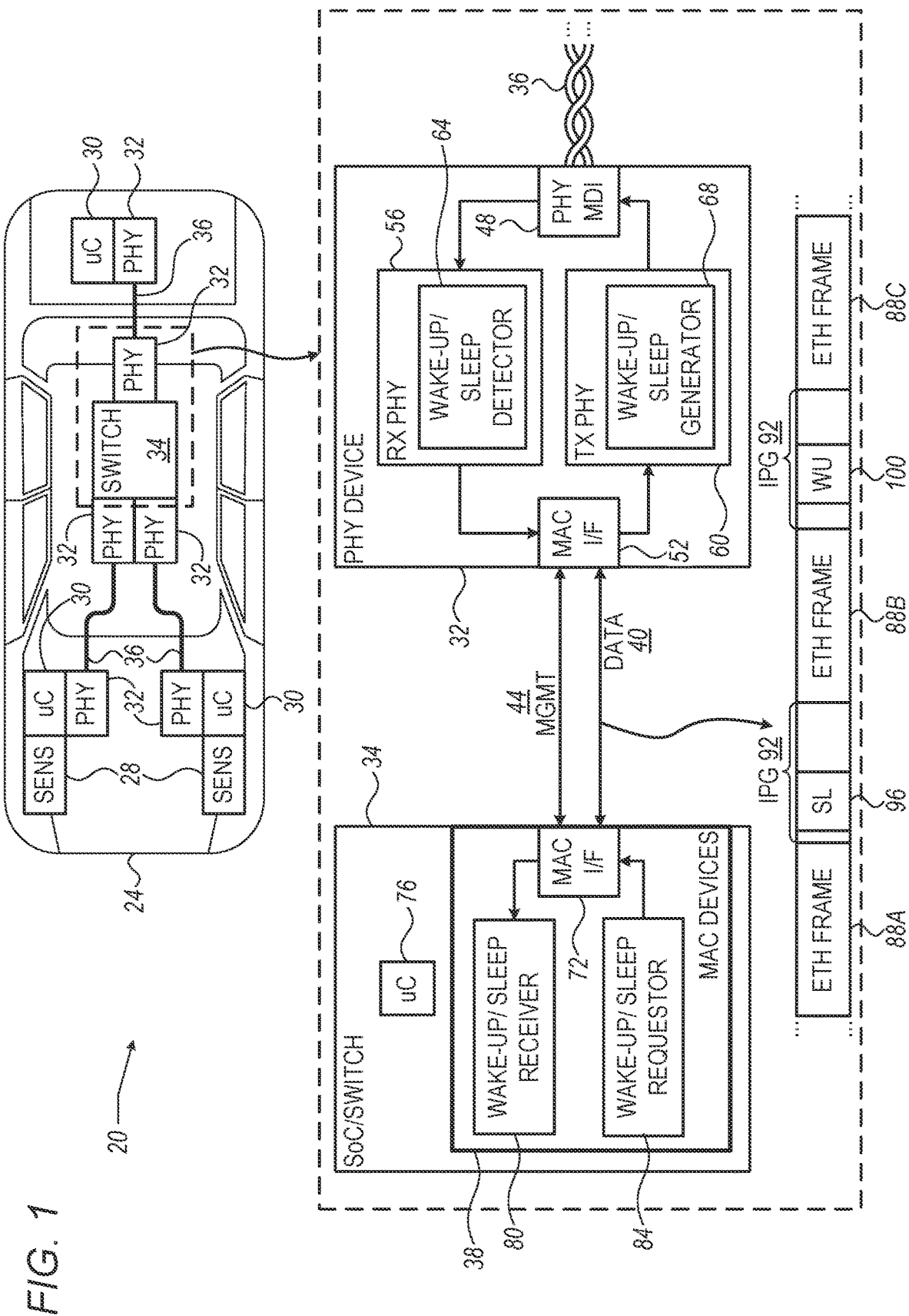
FIG. 1 is a block diagram that schematically illustrates an automotive communication system, in accordance with an embodiment that is described herein.

Embodiments that are described herein provide improved methods and systems for communicating wake-up/sleep commands between Ethernet™ physical-layer (PHY) devices and Medium Access Control (MAC) devices. The embodiments described herein are described in the context of automotive applications, e.g., systems that collect data from sensors within a vehicle. This choice, however, is made solely for the sake of clarity. The disclosed techniques are equally applicable in other applications, for example in industrial and/or smart-home networks.

In some embodiments, an automotive communication system comprises multiple microcontrollers, also referred to as hosts, which are connected to one another by an Ethernet network. In an example network implementation, each host is connected via a physical Ethernet link to a respective port of an Ethernet switch. The switch controller is also regarded as a host in this context. Each host (on the sensor side or on the switch side of tan Ethernet link) is connected to the Ethernet link via an Ethernet MAC device coupled to an Ethernet PHY device.

In some embodiments, at least some of the hosts support multiple power modes, including at least an "active" mode and a "sleep" mode. In various scenarios, a host requests one or more other hosts to transition from the active mode to the sleep mode, or vice versa. For example, the above-cited OPEN TC10 specification specifies Low Power Sleep (LPS) and Wake-Up Request (WUR) commands that are exchanged over the Ethernet link.

In one example scenario a Graphics Processing Unit (GPU) is connected by Ethernet cable to an Ethernet Switch, which is connected to multiple Ethernet cameras via Ethernet ports. To save power, the GPU sends a sleep command to the switch, which in turn propagates the sleep command to the downstream cameras. In the opposite direction, if a certain camera receives critical image information, the camera may send a wake-up command to the switch, which in turn forwards the wake-up command to the GPU and/or to other cameras.

In the present context, any request in which a host requests one or more other hosts to transition between power modes, e.g., between an "active" mode and a "sleep" mode, is referred to herein as a wake-up/sleep request. In an example scenario, a host requests all other hosts to wake up, or to transition to sleep mode. In this scenario, upon receiving the wake-up/sleep request on a certain port, the Ethernet switch is expected to propagate the request to the other ports en-route to the other hosts. In an embodiment, the switch is pre-programmed by a user with a forwarding matrix that specifies forwarding of wake-up/sleep requests among the ports. The forwarding matrix is typically restored following each sleep and subsequent wake-up event.

In some practical cases, however, it is problematic to transfer wake-up/sleep commands between the MAC device and the neighbor PHY device (locally, on the same side of the link). For example, a management interface between the MAC device and the PHY device may not support wake-up/sleep commands. The Gigabit Media-Independent Interface (GMII) specification, for example, specifies only idle and standard Ethernet packet data formats, and has no support for sleep/wake-up commands.

To avoid confusion, the present disclosure distinguishes between wake-up/sleep requests and wake-up/sleep commands. Wake-up/sleep requests are conveyed between peer PHY devices over a physical Ethernet link, e.g., in accordance with the OPEN TC10 specification. Wake-up/sleep commands are exchanged locally, on the same side of a link, between a MAC device and the corresponding PHY device.

Embodiments that are described herein overcome these and other challenges, by transferring wake-up/sleep commands between a MAC device and a neighbor PHY device over the same data interface used for transferring Ethernet data frames. By reusing the data interface for transferal of wake-up/sleep commands, the disclosed technique obviates the need for additional interfaces or pins between the MAC device and the PHY device.

In some embodiments, an Ethernet communication device (a MAC device or a PHY device) comprises a data interface for communicating with a neighbor device (e.g., a corresponding PHY device or MAC device on the same side of the physical Ethernet link). The data interface may comprise, for example, one or more data lines in a Media-Independent Interface (MII) bus that connects the MAC device and the PHY device.

Typically, when exchanging (transmitting and/or receiving) data frames between the Ethernet communication device and the neighbor device over the data interface, successive data frames on the data interface are separated in time by an Inter-Packet Gap (IPG) having at least a pre-defined minimal duration. In some embodiments that are described herein, the Ethernet communication device is configured to exchange (transmit or receive) wake-up/sleep commands with the neighbor device, over the data interface, during IPGs between data frames.

By exploiting the IPGs for transferal of wake-up/sleep commands, the disclosed technique remains compliant with the data-interface specifications (e.g., IEEE 802.3bw) with regards to inter-frame separation. At the same time, the disclosed technique does not degrade the throughput of the data interface.

FIG. 1 is a block diagram that schematically illustrates an automotive communication system 20, in accordance with an embodiment that is described herein. System 20 is installed in a vehicle 24, and comprises multiple sensors 28, multiple microcontrollers 30, multiple Ethernet physical layer (PHY) devices 32 (also referred to as Ethernet transceivers), and an Ethernet switch 34. The PHY devices 32 and switch 34 are interconnected by point-to-point physical Ethernet links 36.

In various embodiments, sensors 28 may comprise any suitable types of sensors. Several non-limiting examples of sensors comprise video cameras, velocity sensors, accelerometers, audio sensors, infra-red sensors, radar sensors, lidar sensors, ultrasonic sensors, rangefinders or other proximity sensors, and the like.

PHY devices 32 typically operate at least partially in accordance with one or more of the IEEE 802.3 Ethernet standards, e.g., IEEE 802.3bw-2015, cited above, and also support wake-up/sleep mechanisms in accordance with the OPEN TC10 specification, cited above.

Depending on the applicable Ethernet standard, links 36 may comprise any suitable physical medium. In the embodiments described herein, although not necessarily, each link 36 comprises a single pair of wires, i.e., a single twisted-pair link. In alternative embodiments, links 36 may comprise multiple wire pairs compliant with suitable IEEE automotive Ethernet standards, or single-ended wire links, not necessarily Ethernet compliant.

In the present example, each sensor 28 is connected to a respective microcontroller 30, which is in turn connected to a respective PHY device 32. The PHY device 32 of each sensor is connected by a link 36 to a peer PHY device 32 coupled to a port of switch 34. On the sensor side of a given link, microcontroller 30 serves as a Medium Access Control (MAC) controller. On the switch side of a given link, MAC functions are carried out by switch 34. Switch 34 and microcontrollers 30 are thus also referred to herein as MAC devices, hosts or Systems-on-Chip (SoC). In some embodiments, the PHY circuitry and the circuitry that performs MAC functions (e.g., microcontroller or switch) are integrated in the same device. In the present example, one of microcontrollers 30 (on the right-hand side of the figure) is a central controller that is not connected directly to any sensor.

An inset at the bottom of FIG. 1 shows the internal structure of switch 34 and of a PHY device 32 connected to a port of the switch, in an embodiment. Among other components, switch 34 comprises a MAC device 38 that is coupled to PHY device 32. Typically, MAC device 38 is duplicated per port of switch 34, i.e., per PHY device 32 coupled to the switch.

PHY device 32 communicates with MAC device 38 of switch 34 over (i) a data interface 40 and (ii) a management interface 44. Data interface 40 is used for sending Ethernet data frames between MAC device 38 and PHY device 32 (typically both from the PHY device to the MAC device, and from the MAC device to the PHY device). Management interface 44 is used for exchanging management information between MAC device 38 and PHY device 32.

In one embodiment, both data interface 40 and management interface 44 are part of a Media-Independent Interface (MII) bus that is connected between PHY device 32 and MAC device 38. The MII bus comprises data lines serving as data interface 40, and a Management Data Input-Output (MDIO) line that serves as management interface 44. MDIO is also referred to as a Serial Management Interface (SMI). Variants of MII comprise, for example, Reduced MII (RMII), Gigabit MII (GMII) and Reduced Gigabit MII (RGMII), for example. Alternatively, any other suitable types of interfaces can be used.

In an embodiment, PHY device 32 comprises a PHY Media-Dependent Interface (MDI) 48, a MAC interface 52, reception PHY (RX PHY) circuitry 56, and transmission PHY (TX PHY) circuitry 60. MDI 48 is configured to transmit and receive analog Ethernet signals over physical link 36 (e.g., a twisted pair). MAC interface 52 is configured to communicate with MAC device 38 of switch 34, over data interface 40 and management interface 44. RX PHY circuitry 56 is configured to carry out various reception tasks of PHY device 32, and TX PHY circuitry 60 is configured to carry out various transmission tasks of the PHY device.

In some embodiments, RX PHY circuitry 56 comprises a wake-up/sleep detector 64, which is configured to detect MDI wake-up/sleep requests received from a peer PHY device over link 36. In an embodiment, wake-up/sleep detector 64 translates the MDI wake-up/sleep requests into wake-up/sleep commands, and sends the wake-up/sleep commands to MAC device 38. TX PHY circuitry 60 comprises a wake-up/sleep generator 68, which is configured to receive wake-up/sleep commands from MAC device 38, and in response generate and transmit MDI wake-up/sleep requests to the peer PHY device over link 36. In some embodiments, the MDI sleep requests and wake-up requests are compliant with the OPEN TC10 specification, cited above.

In an embodiment, switch 34 comprises a microcontroller 76 (also referred to as a host), in addition to MAC device 38. MAC device 38 in switch 34 comprises a MAC interface 72, a wake-up/sleep receiver 80, and a wake-up/sleep requestor 84. Wake-up/sleep receiver 80 is configured to receive wake-up/sleep commands from PHY device 32 and to initiate appropriate action. Wake-up/sleep requestor 84 is configured to receive wake-up/sleep requests from microcontroller 76, and in response to generate and send wake-up/sleep commands to PHY device 32.

In the embodiments described herein, wake-up/sleep commands between MAC device 38 and PHY device 32 are sent over data interface 40, and not over management interface 44 that is separate from data interface 40. The wake-up/sleep commands are inserted between successive Ethernet frames that are sent over data interface 40. This insertion operations are carried out by wake-up/sleep detector 64 (for wake-up/sleep commands sent from PHY device 32 to MAC device 38), and by wake-up/sleep requestor (for wake-up/sleep commands sent from MAC device 38 to PHY device 32).

An example time-line showing transmission of Ethernet data frames and wake-up/sleep commands over data interface 40 is shown at the bottom of FIG. 1. The time-line corresponds to one direction of interface 40, e.g., from MAC device 38 to PHY device 32. A separate time-line typically exists for the opposite direction, e.g., from PHY device 32 to MAC device 38, over separate interface lines of data interface 40.

The time-line shows a sequence of Ethernet frames 88A, 88B, 88C, . . . Every two successive Ethernet frames are separated by an Inter-Packet Gap (IPG) 92, also referred to as an Inter-Frame Gap (IFG). Each IPG 92 has at least a predefined minimum duration. In example embodiments, the predefined minimum duration is 9.6 μs for 10 Mbit/s Ethernet, 0.96 μs for 100 Mbit/s (Fast) Ethernet, 96 ns for Gigabit Ethernet, 38.4 ns for 2.5 Gigabit Ethernet, 19.2 ns for 5 Gigabit Ethernet, 9.6 ns for 10 Gigabit Ethernet, and 3.84 ns for 25 Gigabit Ethernet. Alternatively, other suitable values can be used.

In the present example, a sleep ("SL") command 96 is inserted in the IPG 92 between Ethernet data frames 88A and 88B. A wake-up ("WU") command 100 is inserted in the IPG 92 between Ethernet data frames 88B and 88C. In an embodiment, sleep command 96 comprises two bits, and has the format "01". Wake-up command 100 comprises two bits, and has the format "10". Alternatively, any other suitable format or information content can be used. For example, the wake-up and sleep commands may be sent through an RGMII interface, e.g., in a byte's upper four bits (bits 7:4).

In some embodiments, the MAC interface that transmits Ethernet data packets 88A, 88B, 88C, . . . (MAC interface 52 in PHY device 32, or MAC interface 72 in switch 34) also transmits an idle pattern during IPGs 92 when not transmitting wake-up/sleep commands. In other embodiments, the transmitting MAC device does not transmit an idle pattern during the IPGs.

The description above focuses on a MAC device 38 in switch 34, and the corresponding PHY device 32. This focusing on the switch side of link 36 was chosen purely by way of example. Typically, on the sensor side of link 36, each microcontroller 30 comprises a similar MAC device 38, which interacts with the corresponding PHY device 32. Microcontrollers 30 also carry out similar wake-up/sleep tasks to those carried out by microcontroller 76 of switch 34. Microcontrollers 30 are therefore also regarded herein as MAC devices or hosts, in an embodiment.

In some embodiments, when in sleep mode, most of the circuitry of PHY device 32 is deactivated to conserve power. Wake-up/sleep detector 64 and wake-up/sleep generator 68, however, typically remain active in sleep mode, as well, in order to be able to detect (i) wake-up requests arriving on link 36 and (ii) wake-up commands arriving from MAC device 38. Upon detecting a wake-up request or wake-up command, one of the tasks of wake-up/sleep detector 64 and wake-up/sleep generator 68 is to activate the rest of the circuitry of PHY device 32.

Additionally or alternatively, in MAC device 38, most of the circuitry is typically deactivated in sleep mode to conserve power. Wake-up/sleep receiver 80 and wake-up/sleep requestor 84, however, typically remain active in sleep mode, as well, in order to be able to detect (i) wake-up requests arriving from the host and (ii) wake-up commands arriving from PHY device 32. Upon detecting a wake-up request or wake-up command, one of the tasks of wake-up/ sleep receiver 80 and wake-up/sleep requestor 84 is to activate the rest of the circuitry of MAC device 38.

The configurations of system 20 and its components, such the internal structure of PHY devices 32 and MAC devices 38, as shown in FIG. 1, are example configurations that are depicted solely for the sake of clarity. In alternative embodiments, any other suitable configurations can be used. For example, the disclosed techniques can be used in any other suitable network or link topology, e.g., in a point-to-point Ethernet link between two hosts (e.g., microcontrollers) that does not traverse a switch at all. As another example, the disclosed techniques can be used in a point-to-point Ethernet link between two switches. Elements that are not mandatory for understanding of the disclosed techniques have been omitted from the figure for the sake of clarity.

The different elements of system 20 and its various components may be implemented using dedicated hardware or firmware, such as using hard-wired or programmable logic, e.g., in an Application-Specific Integrated Circuit (ASIC) or Field-Programmable Gate Array (FPGA). Additionally or alternatively, some functions, e.g., functions of microcontroller 76 and/or microcontrollers 30, may be implemented in software and/or using a combination of hardware and software elements.

In some embodiments, microcontroller 76 and/or microcontrollers 30 comprise programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Figure 2:
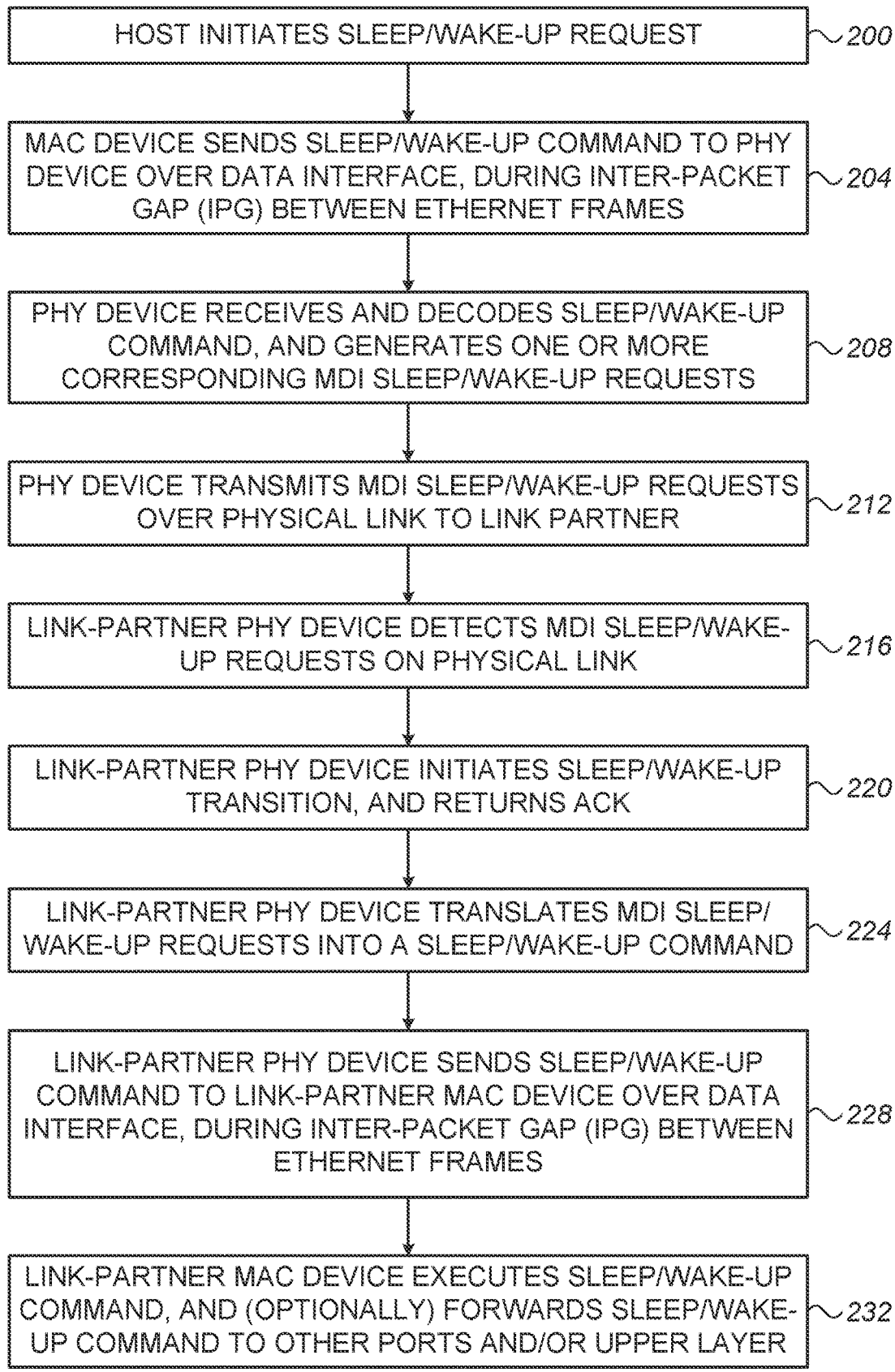
FIG. 2 is a flow chart that schematically illustrates a method for carrying out wake-up/sleep commands in the automotive communication system of FIG. 1, in accordance with an embodiment that is described herein.

FIG. 2 is a flow chart that schematically illustrates a method for carrying out wake-up/sleep commands in automotive communication system 20 of FIG. 1, in accordance with an embodiment that is described herein. As noted above, the disclosed technique can be carried out on the switch side or on the sensor side of a link 36. The description below refers to a host, a MAC device and a PHY device. When implemented on the switch side, the host comprises microcontroller 76 of switch 34, the MAC device comprises MAC device 38 in a port of switch 34, and the PHY device comprises PHY device 32 that is coupled to that port, in an embodiment. When implemented on the sensor side, the host comprises microcontroller 30, the MAC device comprises MAC device 38 in microcontroller 30, and the PHY device comprises PHY device 32 that is coupled to this microcontroller 30 in an embodiment.

The method of FIG. 2 begins with the host initiating a wake-up/sleep request, at a host request operation 200. At a MAC transmission operation 204, the MAC device sends a wake-up/sleep command to its respective PHY device over data interface 40, during IPG 92 between Ethernet data frames. At a PHY translation operation 208, the PHY device receives the wake-up/sleep command from the MAC device over data interface 40, decodes the command, and generates one or more corresponding MDI wake-up/sleep requests. At a PHY transmission operation 212, the PHY device transmits the MDI wake-up/sleep requests over physical link 36 to the link partner.

In the link partner, the link-partner PHY device detects the MDI wake-up/sleep requests on physical link 36, at a PHY detection operation 216. At a wake-up/sleep initiation operation 220, the link-partner PHY device initiates a transition between sleep mode and wake-up mode in the link partner, as instructed by the MDI wake-up/sleep requests. The link-partner PHY device sends back an acknowledgement over physical link 36.

At a translation operation 224, the link-partner PHY device translates the MDI wake-up/sleep requests into a wake-up/sleep command. At a PHY transmission operation 228, link-partner PHY device sends the wake-up/sleep command to the link-partner MAC device, over data interface 40, during IPG 92 between Ethernet data frames.

At an execution and forwarding operation 232, the link-partner MAC device executes the requested transition between sleep mode and wake-up mode in the link partner. Optionally, the link-partner MAC device may forward the wake-up/sleep command to other ports (in case of a switch) and/or to an upper layer, e.g., to the link-partner host.

Although the embodiments described herein mainly address automotive network communication systems, the methods and systems described herein can also be used in other applications, such as in industrial network communication systems that use Ethernet links to collect data from sensors and/or control various devices in an industrial environment, and in smart-home systems that collect data from, and control, home sensors and appliances. Other possible examples include smart drones and aerospace applications.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Ethernet communication device, comprising:
 a Media-Independent Interface (MII), comprising:
  one or more data lines for communicating with a neighbor device; and
  at least a management line for communicating management information with the neighbor device; and
 circuitry, configured to:
  exchange Ethernet data frames with the neighbor device over the one or more data lines of the MII, wherein successive data frames are separated in time by an Inter-Packet Gap (IPG) having at least a predefined minimal duration; and
  further exchange with the neighbor device, over the one or more data lines of the MII and not over the management line of the MII, during the IPG between Ethernet frames exchanged on the data interface, a wake-up/sleep command that instructs switching between an active mode and a sleep mode.

2. The Ethernet communication device according to claim 1, wherein the Ethernet communication device comprises an Ethernet physical layer (PHY) device, and wherein the neighbor device comprises an Ethernet Medium Access Control (MAC) device.

3. The Ethernet communication device according to claim 1, wherein the Ethernet communication device comprises an Ethernet Medium Access Control (MAC) device, and wherein the neighbor device comprises an Ethernet physical layer (PHY) device.

4. The Ethernet communication device according to claim 1, wherein the circuitry is configured to generate the wake-up/sleep command and to insert the generated wake-up/sleep command in the IPG, for transmission to the neighbor device over the one or more data lines of the MII.

5. The Ethernet communication device according to claim 4, wherein the circuitry is configured to transmit an idle pattern during the IPG, when not transmitting the wake-up/sleep command.

6. The Ethernet communication device according to claim 1, wherein the circuitry is configured to receive the wake-up/sleep command from the neighbor device during the IPG, to decode the received wake-up/sleep command, and to cause a Medium Access Control (MAC) device to wake-up from sleep mode or to enter sleep mode in response to the wake-up/sleep command.

7. The Ethernet communication device according to claim 6, wherein the circuitry is configured to distinguish between the wake-up/sleep command and an idle pattern, which is transmitted by the neighbor device during the IPG when not transmitting the wake-up/sleep command.

8. A method for Ethernet communication, comprising:
exchanging Ethernet data frames with a neighbor device over one or more data lines of a Media-Independent Interface (MII), wherein successive data frames are separated in time by an Inter-Packet Gap (IPG) having at least a predefined minimal duration;
exchanging management information with the neighbor device over at least a management line of the MII; and
further exchanging with the neighbor device, over the one or more data lines of the MII and not over the management line of the MII, during the IPG between Ethernet frames exchanged on the data interface, a wake-up/sleep command that instructs switching between an active mode and a sleep mode.

9. The method for Ethernet communication according to claim 8, wherein exchanging the Ethernet data frames and the wake/up command comprises exchanging the Ethernet data frames and the wake/up command with an Ethernet Medium Access Control (MAC) device.

10. The method for Ethernet communication according to claim 8, wherein exchanging the Ethernet data frames and the wake/up command comprises exchanging the Ethernet data frames and the wake/up command with an Ethernet physical layer (PHY) device.

11. The method for Ethernet communication according to claim 8, wherein exchanging the wake/up command comprises generating the wake-up/sleep command and inserting the generated wake-up/sleep command in the IPG, for transmission to the neighbor device over the one or more data lines of the MII.

12. The method for Ethernet communication according to claim 11, further comprising transmitting an idle pattern during the IPG, when not transmitting the wake-up/sleep command.

13. The method for Ethernet communication according to claim 8, wherein exchanging the wake-up/sleep command comprises receiving the wake-up/sleep command from the neighbor device during the IPG, and further comprising decoding the received wake-up/sleep command, and causing a Medium Access Control (MAC) device to wake-up from sleep mode or to enter sleep mode in response to the wake-up/sleep command.

14. The method for Ethernet communication according to claim 13, wherein exchanging the wake-up/sleep command comprises distinguishing between the wake-up/sleep command and an idle pattern, which is transmitted by the neighbor device during the IPG when not transmitting the wake-up/sleep command.

* * * * *